Figure 1:
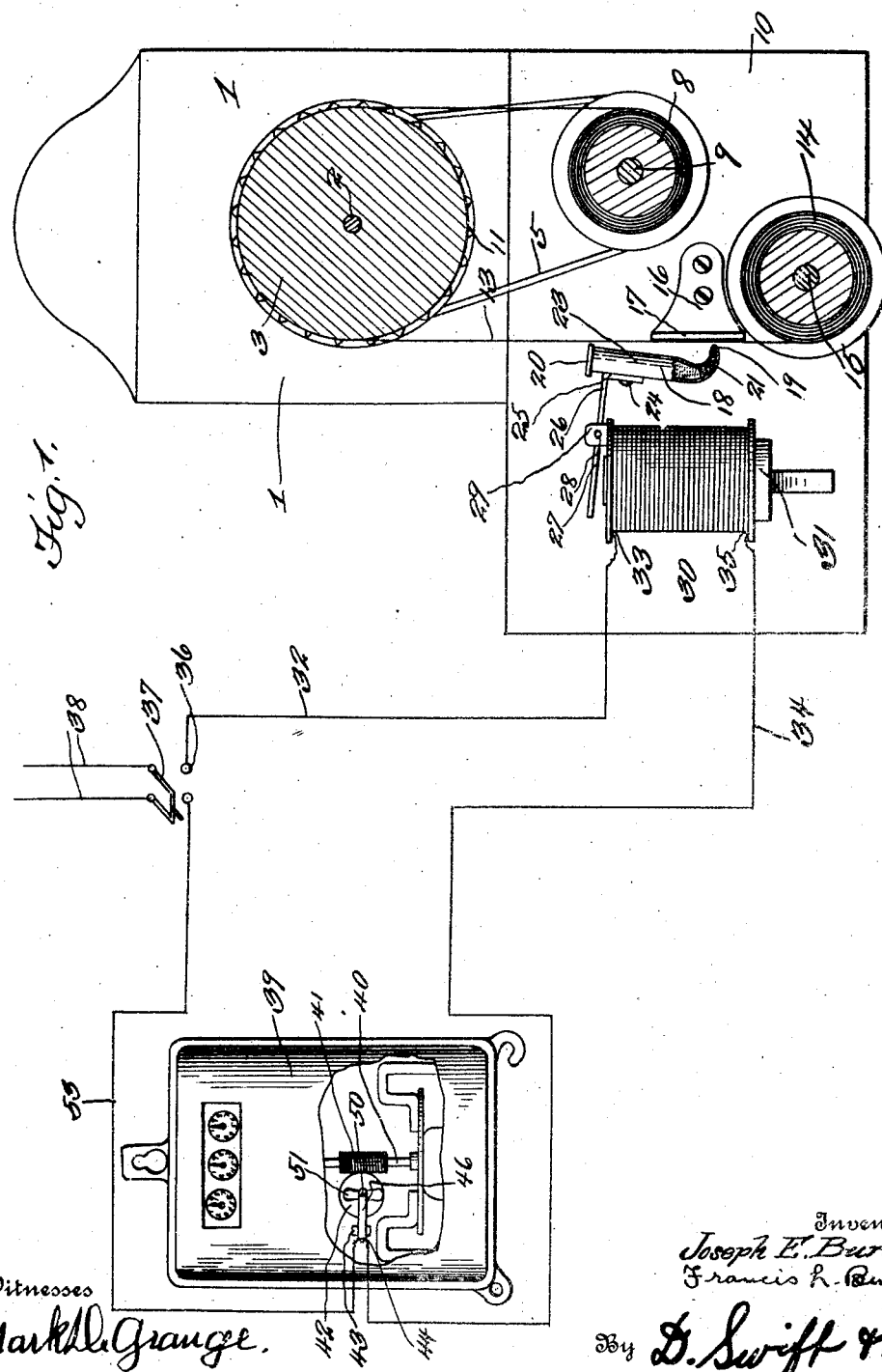

UNITED STATES PATENT OFFICE.

JOSEPH E. BURCH AND FRANCIS L. BURCH, OF ST. LOUIS, MISSOURI.

PRINTING-METER.

1,091,804.　　　　Specification of Letters Patent.　　Patented Mar. 31, 1914.

Application filed May 10, 1913. Serial No. 766,798.

*To all whom it may concern:*

Be it known that we, JOSEPH E. BURCH and FRANCIS L. BURCH, citizens of the United States, residing at St. Louis, in the State of Missouri, have invented a new and useful Printing-Meter; and we do hereby declare the following to be a full, clear, and exact description of the invention, such as will enable others skilled in the art to which it appertains to make and use the same.

This invention relates to the art of printing meters, particularly to printing watt meters.

One of the objects of the invention is to provide a machine for recording the reading from a watt meter, automatically, and in order to insure accuracy. Therefore, to this end it is the aim to provide novel means to make and break an electric circuit every twenty-five revolutions of the watt meter shaft, for momentarily energizing an electro-magnet, which operates a dotting device (which is carried by the armature of the magnet). As the dotting device is actuated a dot is made upon a recording sheet, provided with necessary graduations indicating every hour and all fractions thereof during the day, and being that the watt meter shaft rotates twenty-five revolutions between every make and break of said means, it will be seen that every dot upon the record sheet represents twenty-five revolutions of the watt meter shaft. Therefore, in view of the fact that each revolution of the watt meter shaft represents a certain number of watts, such by a constant, then by ascertaining the number of dots upon the record sheet within an hour, which record sheet moves eight inches in that time, there will be discovered the number of watts used during the hour.

In practical fields it may be found necessary to subject the minor details of construction to alterations, according to various conditions, and the kind of watt meter used, and to which alterations the patentee is entitled, provided the alterations fall within the scope of what is claimed.

The invention comprises further features and combination of parts, as hereinafter set forth, shown in the drawings and claimed.

Figure 2:
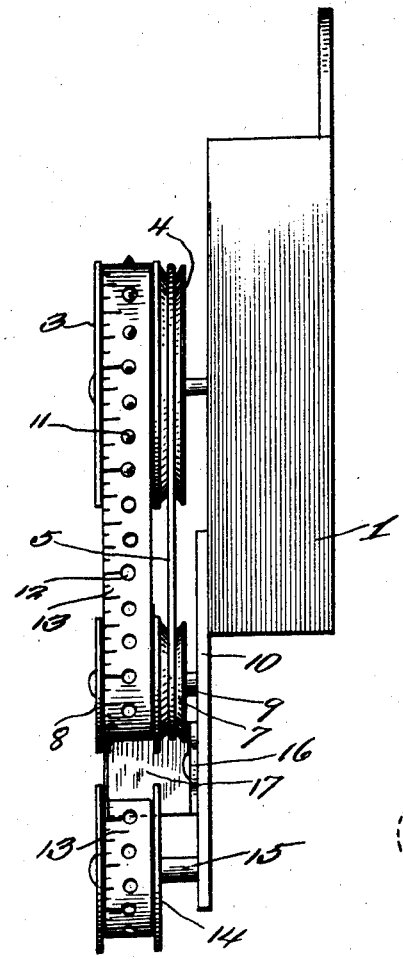
Figure 4:
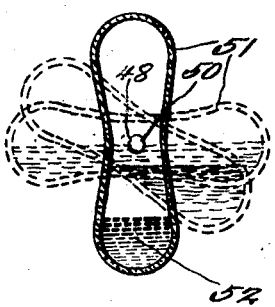
Figure 3:
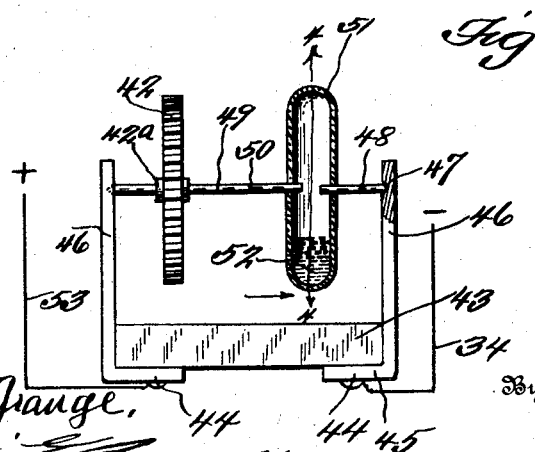

In the drawings:—Figure 1 is a view in elevation showing parts broken away, illustrating the application of the improved printing watt meter. Fig. 2 is an edge view. Fig. 3 is an enlarged detail view, showing the make and break mechanism carried by the watt meter and actuated by the watt meter shaft, and is located in the circuit of the electro-magnet. Fig. 4 is a detail view of the member 51.

Referring more particularly to the drawings, 1 designates any suitable eight-day clock, upon the shaft 2 (which carries the hour hand, not shown) of which a wheel 3 is mounted to rotate with the shaft. This wheel 3 is provided with a grooved portion 4, with which a slip belt 5 engages. This slip belt also engages a grooved portion 7 of the receiving roll 8, which is mounted upon a stub shaft 9 mounted in the plate 10. The wheel 3 has its periphery provided with a plurality of projections 11, of which there may be any suitable number, to enter the perforations 12 of the record sheet or tape 13, so as to feed the record sheet or tape from the supplied roll 14 over the wheel 3, to and upon the receiving roll 8. This record sheet or tape is provided with graduations in inches and all fractions thereof, every eight inches representing an hour. The supply roll is mounted upon the stub shaft 15 of the plate 10. Fixed upon the plate 10 is a bracket member 16 having a stop or stamping block or cable portion 17, forming a backing for the record sheet or tape, so that the dotting device 18 will not perforate the sheet. The dotting device consists of a tubular member, one end of which terminates in a curved portion or neck having an orifice 19, while the other end is provided with a closure 20. Arranged in the curved portion or neck 21 is a body of felt or the like 22, which will absorb the ink 23 in the tube, and gradually allow it to percolate through said orifice. This ( )tting cevice or tube is secured at 24 to the angular end 25 of one arm 26 of the armature 27, which is pivoted at 28 in ears 29 of the electro-magnet 30. This magnet is adapted to be secured in any suitable manner, say for instance, by means of a bracket 31 to the plate 10. A lead 32 connects to the magnet as at 33, while another lead 34 connects to the magnet as at 35. The lead or wire 32 connects at 36 to the usual form of switch, which controls the current from the main lines 38. As shown in the drawings a conventional form of watt meter 39 is disclosed, the revoluble shaft 40 of which is provided with a worm 41, which meshes with a worm wheel 42, of a circuit make and break device. A bracket constructed of any suitable insulating material, designated by the character 43, is secured in any suitable manner to the watt meter frame! Secured to the bracket 43 as at 44 are the angular ends 45 of the arms 46. Each arm 46 is provided with a depression 47, which constitute bearings for the two sections 48 and 49 of the shaft 50, on which the worm wheel 42 is mounted to rotate therewith. The two sections 48 and 49 are connected by a glass tube 51, in which a vacuum is formed, and which contains a small body of mercury. The ends of the sections 48 and 49 of the shaft are slightly spaced apart and constitute contacts. This mercury 52 is adapted to run from one end to the other of the tube 51 as the shaft rotates, and is of such a quantity as to make contact with the adjacent ends or contact portions of said sections 48 and 49 upon every half revolution of the shaft 50, and being that the lead 34 is connected at 44 to one of the arms 46, while the other arm 46 is connected by a lead 53 to the switch 37, the magnet 30 will be energized every time the mercury makes contact with the sections 48 and 49 of said shaft. Each time the magnet 30 is energized its armature is attracted, and the dotter records a dot upon the record sheet or tape, and in view of the fact that the dotter is actuated through the medium of the make and break device, every twenty-five revolutions of the watt meter shaft, and being that each revolution of the watt meter shaft represents so many watts, there will be recorded upon the record sheet or tape the reading of the watt meter, as to the amount of current utilized per hour. It is to be understood, however, that this recording mechanism may be used in connection with a plurality of watt meters. In other words, a recording mechanism may be provided for each one of a plurality of watt meters, but which arrangement is not shown.

Assuming 25 revolutions of the shaft 40 to represent a consumption of 10 kilowatt-hours and a load constituting 10 kilowatts was carried for one hour, the shaft 40 would make 25 revolutions in one hour and the dotter 18 would tap the recording sheet 13 at hour intervals. If the current consumption were increased to 20 kilowatts per hour, the shaft 40 would make 25 revolutions in one-half hour, and the dotter 18 would mark the paper 13 twice hourly or at half-hour intervals. With these arbitrary assumptions every dot will represent a consumption of 10 kilowatt-hours and when the load rises above or falls below this amount, the speed of the shaft 40 will be either increased or diminished, which will result in a variable tapping of the dotter 18. The paper 13, however, being run at a uniform speed, the variable tapping of the dotter 18 will indicate the intensity of the load between certain periods of time.

The invention having been set forth, what is claimed as new and useful is:—

1. In combination with a watt-meter, an electric circuit including a pair of opposing revoluble contacts, one of which has connections with the shaft of the watt-meter, a magnet in said circuit, a hollow member revoluble with said contact and including means adapted to fall from end to end as the member revolves, to intermittently close the circuit between the opposing contacts to excite the magnet, which is adapted to operate a dotting device against a record sheet.

2. In combination with a watt-meter, an electric circuit including a pair of opposing revoluble contacts, one of which has operative connections with the shaft of the watt-meter, a magnet in said circuit, a hollow member having a vacuum space therein and revoluble with said contacts and including means in said vacuum space adapted to shift automatically from end to end of said space as the member revolves, said shifting means constituting a device to intermittently close the circuit between the opposing contacts to intermittently excite the magnet, which is adapted to operate a dotting device against a record sheet.

3. In improvements in printing meters, the combination with a watt-meter, of an electric circuit including a pair of conducting arms, an insulating base for said arms, a pair of opposing revoluble terminals mounted in bearings of said arms, which terminals and the arms are arranged in said circuit, one of said terminals having a gear thereon and insulated therefrom and having gear connections with the shaft of the watt-meter, a hollow member having a vacuum space therein revoluble with said terminals, a magnet in said circuit, and a movable element in said space adapted to shift automatically from end to end thereof to automatically and intermittently close the circuit between said opposing terminals to excite the magnet which is adapted to operate a recording mechanism.

4. In combination with a watt-meter, an electric circuit including a magnet in said circuit, a make and break device in said circuit comprising revoluble means having connections with the watt-meter shaft and provided with spaced apart contacts, and means carried by the revoluble means to be automatically shifted intermittently to electrically connect the contact intermittently to close the circuit on said magnet, which is adapted to operate a recording instrument.

5. In combination with a watt-meter, an electric circuit including an electro-magnet therein, a revoluble member having connections with the watt-meter shaft and arranged in said circuit, said member having two opposing contacts, shiftable means carried by said member actuated automatically as the member revolves to intermittently connect the contacts electrically to close the circuit for energizing the magnet, which operates a recording instrument.

6. In combination with a watt-meter, an electric circuit including an electro-magnet, a revoluble member having connections with the watt-meter shaft, said member comprising a spindle shaft consisting of two sections constituting contacts and a tubular device constructed of non-conducting material connecting said contacts and revolving therewith, and means shiftable from end to end of said tube as the tubular device revolves to electrically and automatically connect said contact to intermittently close the circuit to energize said magnet, which is adapted to operate a recording instrument.

7. In combination with a watt-meter including an electric circuit, and a magnet in said circuit, a make and break device in said circuit, comprising revoluble means having connections with the watt-meter shaft and including a pair of spaced apart opposing contacts, and means shifted intermittently by the revoluble means to connect said contacts to close the circuit on said magnet, which is adapted to operate a recording instrument.

In testimony whereof we have signed our names to this specification in the presence of two subscribing witnesses.

JOSEPH E. BURCH.
FRANCIS L. BURCH.

Witnesses:
P. C. FLOYD,
C. E. GRINSTEAD.